Dec. 15, 1959
R. B. LUNDY ET AL
2,917,069
ADJUSTABLE PORT VALVE
Filed Aug. 27, 1956
2 Sheets-Sheet 1
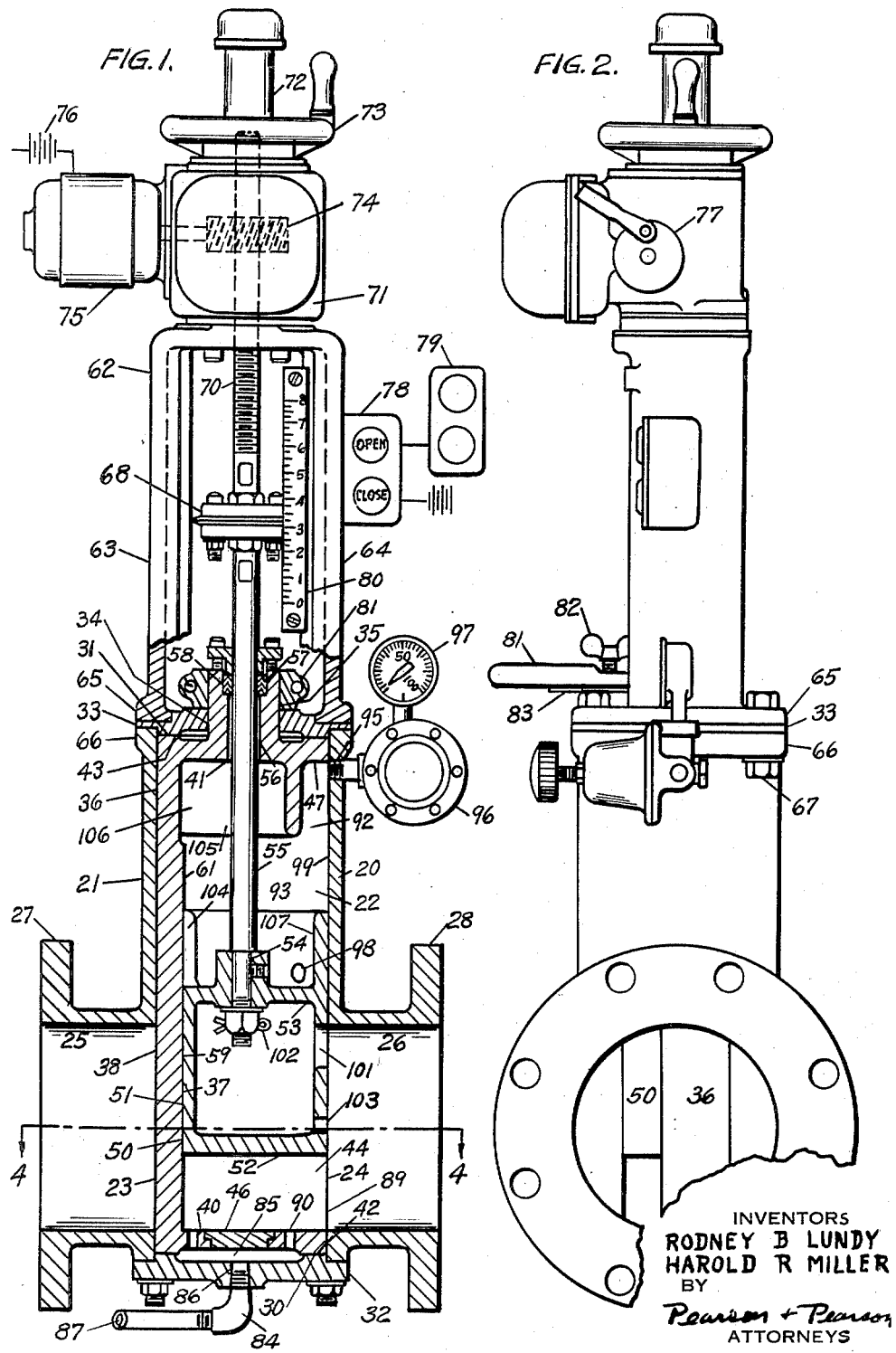
INVENTORS
RODNEY B LUNDY
HAROLD R MILLER
BY
Pearson + Pearson
ATTORNEYS

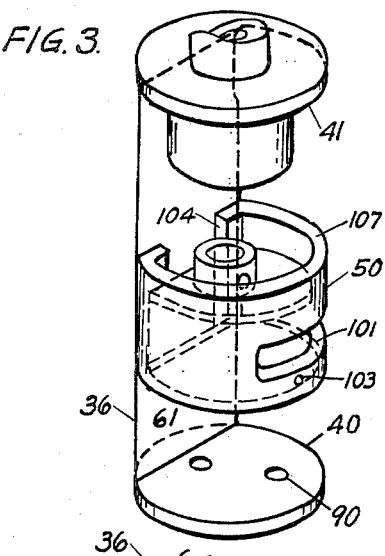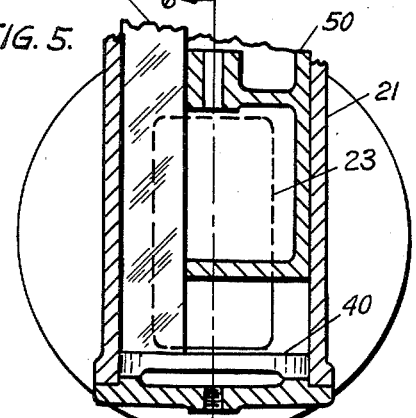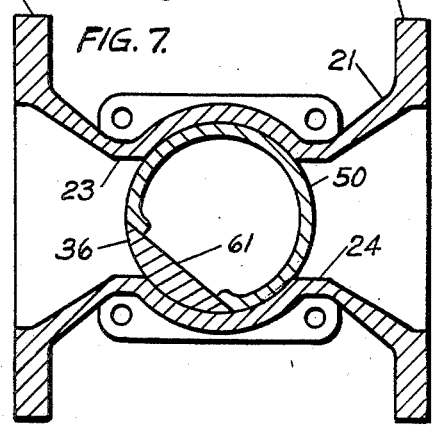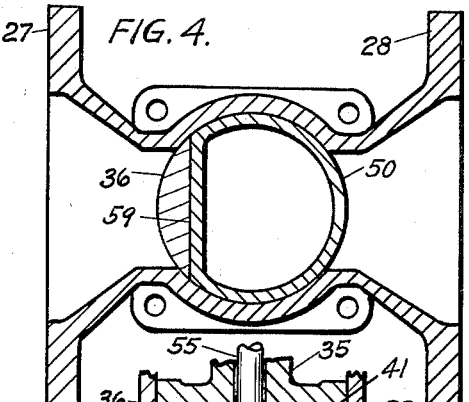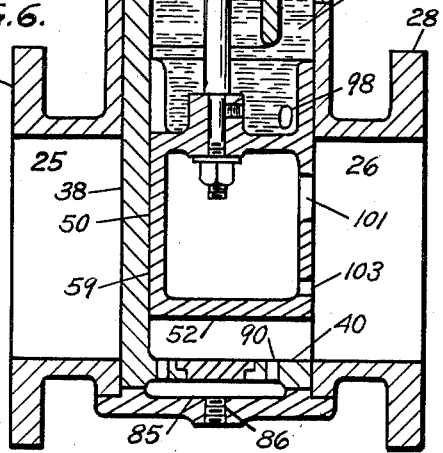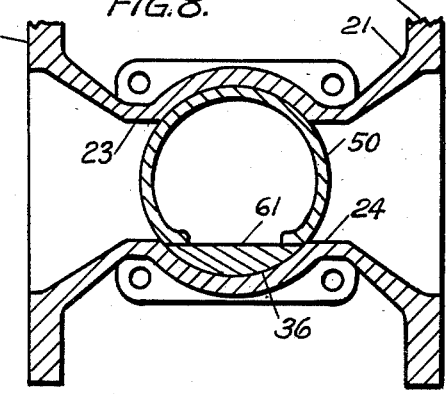

United States Patent Office 2,917,069
Patented Dec. 15, 1959

2,917,069

ADJUSTABLE PORT VALVE

Rodney B. Lundy, Neenah, and Harold R. Miller, Menasha, Wis., assignors, by mesne assignments, to John W. Bolton & Sons, Inc., Lawrence, Mass., a corporation of Massachusetts Application August 27, 1956, Serial No. 606,506

5 Claims. (Cl. 137—240)

This invention relates to adjustable port valves and especially to such valves for use in paper stock conduit systems.

Unlike clear liquid conduit systems, the liquid in a paper stock system contains, among other materials, a large quantity of fibres in suspension with the result that ordinary valves tend to become plugged by the stock becoming de-watered. This is especially true of valves in which the gate opening, when nearly closed, is long and narrow since the fibres tend to accumulate and pile up to eventually stop the passage of stock entirely. On the other hand, valves which are of the adjustable port type if arranged to produce an opening that remains substantially equi-sided or square as it is closed, tend to create objectionable swirling and turbulence. It is desirable therefore, in paper stock systems to provide rectangular port openings with about a two to one ratio as to the parallel sides thereof and to maintain this ratio as the size of the valve or gate opening is increased or decreased.

One type of adjustable port valve in which such a rectangular opening is maintained is U.S. Patent 1,858,877 to Brown of May 17, 1932 wherein a rotatable, cylindrical gate is provided with an axially slideable plug having a pair of leg or curtain members. However, the use of a sliding curtain at opposite sides of a rotatable plug causes the liquid passing through the valve to follow a zigzag path which may produce excessive turbulence and produces two constricted openings at which clogging or plugging may take place.

An object of this invention is to provide an adjustable port valve in which a rectangular opening is maintained during closure and which valve has only a single constricted orifice formed by a rotatable gate and axially slideable plug.

Another object of the invention is to provide such an adjustable port valve with a coarse, manually operable, positive lateral adjustment and a fine, accurate power operable longitudinal adjustment, the opening created being constrictable downwardly rather than upwardly to avoid forming a settlement pocket at the floor of the opening and allowing an exact required volume to flow through the adjustable orifice.

A further object of the invention is to provide a paper stock, adjustable port valve in which the working faces may be purged intermittently or continuously with clear water under pressure, the clear water not adversely diluting or contaminating the stock.

Still another object of the invention is to provide a paper stock, adjustable port valve in which the plug is slideable by power and the sliding connection is sealed by clear water under greater pressure than the pressure of the stock whereby any leakage is of clear water into the stock rather than from the stock out of the valve.

Other objects and advantages of the device will be apparent from the claims, the description of the drawings and the drawings in which Fig. 1 is a side elevation of an adjustable port valve constructed in accordance with this invention and with the lower portion thereof broken away.

Fig. 2 is a front elevation of the valve.

Fig. 3 is a perspective view of the gate and plug of the valve.

Fig. 4 is a plan view on line 4—4 of Fig. 1 showing the valve in closed position.

Fig. 5 is a fragmentary front view showing the inlet port about half open.

Fig. 6 is a fragmentary side view in section on line 6—6 of Fig. 5 showing the liquid pressure sealing means in operation.

Fig. 7 is a plan view similar to Fig. 4 showing the inlet port about half open, and Fig. 8 is a view similar to Fig. 4 showing the inlet port entirely open.

As shown in the drawings, the adjustable port valve 20 includes a valve body 21 having a cylindrical valve chamber 22 with opposed, rectangular, lateral ports 23 and 24 opening thereinto. Valve body 21 also includes divergent passages 25 and 26 terminating in flanges 27 and 28 by which the valve may be coupled into a liquid conduit such as a paper stock conduit between a Jordan engine and a machine chest. The ports 23 and 24 are rectangular in about a two to one ratio whereby the lateral width thereof is about half the longitudinal height thereof.

Preferably the cylindrical valve chamber 22 is at least twice the longitudinal dimension, or height, of the ports 23 and 24 in order to provide space for a longitudinally movable valve plug capable of closing the inlet port 23. Preferably also the chamber 22 terminates at its upper and lower end in a circular opening 30 and 31, the opening 30 being closed by a cover plate 32 and the opening 31 being closed by a cover plate 33. Plate 33 is axially bored at 34 to rotatably receive the upstanding neck 35 of a valve gate 36 rotatably mounted in valve chamber 22.

Valve gate 36 is of cylindrical outline, coextensive in height with chamber 22, and is provided with an imperforate wall 37 having a curved arcuate working face 38 capable of entirely closing the inlet port 23. Preferably wall 37 is in the form of a minor segment of said cylindrical outline, terminating at top and bottom in opposed integral discs 40 and 41 which are rotatably seated within the opposite ends 42 and 43 of chamber 22. Valve gate 36 also includes a cutout, or recess 44 forming the major segment of said cylindrical outline and terminating at top and bottom in the inside faces 46 and 47 of the discs 40 and 41. The recess 44 is at least twice the height of the ports 23 and 24 in order to fully accommodate a valve plug 50 in open and closed position.

Valve plug 50 is substantially equal in height to the height of inlet port 23 and in cross section conforms to the major cylindrical segment shape of recess 44 around its arcuate curved, working face 51 whereby the plug forms a curtain for the opening created by the gate. Plug 50 includes a flat laterally extending lower working face 52 parallel to the inside face 46 of disc 40 whereby the stock passing through the gate opening is guided in top and bottom parallel planes until it reaches the outlet port 24. In closed or downward position, flat face 52 of plug 50 is seated on the flat seat formed by the inside face 46 of disc 40 and in open or upward position flat face 52 is just above the upper extremity of the ports 23 and 24.

A cross partition 53 is provided in plug 50, intermediate of its height, the partition 53 being axially bored at 54 to receive a thrust, or operating rod 55. Similarly the neck 35 of gate 36 is axially bored at 56 to receive rod 55 and neck 35 is counter bored at 57 to receive a suitable packing element 58. The flat chordal face 59 of the segmental plug 50 slideably engages the flat chordal face 61 of the wall 37 of gate 36 during the axial movement of the plug relative to the gate under the influence of rod 55. The said chordal faces also cause the plug 50 to rotate with the gate 36 regardless of its axial position relative to the gate.

Above the valve body 21, a yoke 62 is mounted, the yoke 62 having parallel legs 63 and 64 terminating in a flange 65 attached to a flange 66 of the valve body by suitable bolts 67, the top cover plate 33 being clamped therebetween. Rod 55 includes a coupling 68 and is finely threaded at its upper end 70 which end passes through a gear case 71 mounted on top of yoke 62 and terminates under a cap 72 at a manually operable emergency turning wheel 73. Gear case 71 includes a fine worm gear 74 meshed with the threaded end 70 of rod 55 and powered by a reversible electric motor 75 supported on gear case 71. A manual control 77 is also provided on gear case 71.

Motor 75 is included in an electric circuit which includes a suitable source of electricity 76, a control switch 78 and one or more remote control switches 79, the said switches being of any well known type. A scale 80 is fixed to one of the legs 64 of yoke 62 and the coupling 68 may be used as a pointer to indicate on the scale the axial position of the plug and the height of the port opening in inches created thereby.

A hand lever 81 is affixed to the neck 35 of gate 36 above the cover plate 33, for angularly turning the gate to the desired lateral opening as a coarse adjustment before longitudinally moving the plug by power to secure a fine adjustment longitudinally of the opening in the preferred two to one ratio. A wing type set screw 82 is provided for fixing the hand lever 81 at the proper angular position relative to an angular scale 83.

Purging means 84 is provided at the lower end 42 of chamber 22 preferably including a circular liquid chamber 85 fed with liquid under pressure through a passage 86 in the cover plate 32 by a pipe 87 leading to a source of pressurized liquid such as a pressure tank not shown. The lower disc 40 of gate 36 includes one or more through passages 90 leading from chamber 85 to the inside or upper face 46 of the disc, this face forming the floor of the gateway or valve opening, and the flat seat for the flat working face 52 of plug 50 when in closed position. In paper stock systems, clear water may be continually fed under pressure from pipe 87, through chamber 85 and passages 90 to clear the face 46 of accumulations of fibres or other clogging material and to clear the peripheral disc edge as at 89. To further purge the same, the gate 36 may be closed and even greater clear water pressure introduced through passages 86 and 90 to wash out the entire lower interior of chamber 22. The addition of such clear water to the paper stock has no adverse effect and any diluting effect of the water may be predetermined and in accordance with desired final characteristics of the paper.

Sealing means 92 is provided at the upper end 43 of chamber 22, in rear of the path of the plug 50. The upper portion 93 of chamber 22 is substantially liquid tight in view of the close fit of plug 50 and gate 36 in the chamber and the close fit and packing between neck 35 and bore 34 and rod 55 and the bores 54 and 56. Since the liquid, such as paper stock, passing through valve 20 is normally under pressure, the normal tendency thereof would be to leak outwardly through any crevices or joints and for any foreign material in the stock to become lodged in such crevices. In the valve of this invention, however, liquid which is preferably clear water, is maintained in the upper portion 93 of chamber 22 under a greater pressure than the normal maximum pressure of the liquid in valve 20. This is accomplished by providing a passage 95 in a wall of valve body 21 and connecting the same through suitable reducing valves such as 96 to a pressurized fresh water supply such as a tank or pump not shown. An indicator gauge 97 is provided and the pressure may be set at the desired amount whereby clear water will flow into the chamber as the plug 50 travels downward and flow out of the chamber upon the upward travel of plug 50, thus achieving a yieldable but steady pressure. Thus the pressure of the clear water continually overcomes the pressure of the paper stock in valve 20 and any leakage is of clear water into the stock rather than vice versa. In addition, the fresh water which may leak into the stock must do so through a crevice or joint and therefore keeps the same free of clogging material.

Sealing means 92 is arranged to purge the upper mechanism in chamber 22, when the gate 36 is closed and the plug 50 is in full downward position. The upper wall of plug 50 is provided with an aperture 98 which normally is closed by the inside face 99 of valve chamber 22 when the gate 36 and plug 50 are turned to operative position. When the gate is fully closed, however, and plug 50 is also fully closed, the aperture 98 connects the upper portion 93 of chamber 22 to the outlet port 24 thereby unsealing the portion 93 and permitting the flushing out of the parts in rear of plug 50 into the outlet.

Plug 50 includes a large opening 101 in the rear, non-working curved face thereof to give access to the cotter pin connection 102 of the thrust rod and a suitable drain hole 103 is also provided therein. Plug 50 is also provided with a slot 104 in the chordal face 59, this face being flat against the chordal face 61 of gate 36 at all times. The slot 104 permits the gate 36 to be provided with a loop-shaped flange 105, the flange 105 being partially concentric with discs 41 and 42 but constricted at 106 to pass the slot 104 in the full upward position of plug 50. Flange 105 is of such radius that it may depend downwardly into the upper portion 93 of chamber 22 and slide by and overlap the upstanding wall portion 107 of plug 50, above partition 53. Thus the gate 36 is strengthened without having to be unduly lengthened.

In operation, fresh water under pressure is introduced into the upper portion 93 of chamber 22 to seal the valve and into chamber 85 to purge the floor and seat of the valve. The gate 36 is then angularly moved to a coarse adjustment creating a rectangular opening for the passage of paper stock which has lost its desirable two to one ratio. The operator then, at the valve, or at a remote position such as the Fourdrinier machine, electrically actuates the fine worm gear plug adjustment to axially slide the plug 50 downwardly thereby curtaining the opening formed by the rotatable gate and again restoring the two to one ratio of the ports 23 and 24 in the form of a smaller opening. The stock passes through only one constricted opening and is then guided by the flat lower face 52 of plug 50, the flat upper face 46 of disc 40, the flat chordal face 61 of gate 36 and the curved inside face 99 of chamber 22 into the outlet port 24. Minor adjustments may be made at any time by raising or lowering the plug 50 and leakage is inward at all times rather than outward.

We claim:

1. An adjustable port valve comprising a valve body having a cylindrical valve chamber with opposed, rectangular, lateral ports, said chamber being at least twice the height of said ports; a valve gate of cylindrical outline coextensive with, and rotatable within said chamber, said gate having upper and lower discs connected by a single imperforate wall in the form of a minor segment of said cylinder and having the major remaining segment thereof, between said discs, cut away to form a valve plug receiving recess at least twice the height of said ports; a valve plug axially slideable in said recess, said plug corresponding in shape to the major remaining segment of said cylinder but being substantially equal in height to the height of said ports, the chordal face of said plug slideably engaging the wall formed of said minor segment of said gate wall to cause said plug to rotate with said gate in said chamber; means connected to said valve gate and extending outside said valve body for rotating said gate and plug to open and close one said port laterally and means connected to said valve plug and extending outside said valve body for axially sliding said plug relative to said gate to open and close said port longitudinally.

2. An adjustable port valve as specified in claim 1 wherein the means for axially sliding said plug includes a remotely controllable, reversible, electric motor supported on said valve body; a manually rotatable thrust rod having one end fixed to said plug and the other end adjacent said motor and a worm gear on said motor threadedly engaged with said rod for remotely securing a fine adjustment of said plug relative to said gate.

3. An adjustable port valve as specified in claim 1 wherein the upper disc of said valve gate includes a looped flange depending downwardly into said recess and said plug includes a peripheral flange extending upwardly into said recess, said peripheral flange being slotted to pass by and overlap said looped flange when said plug is in full upward position in said recess.

4. An adjustable port valve as specified in claim 3 wherein said valve gate, valve plug and valve body together form a liquid tight chamber above said plug when said valve is open but said plug includes an aperture through said peripheral flange connecting said chamber to a lateral valve port when said valve is closed for purging said chamber.

5. An adjustable port valve comprising a valve body having a cylindrical valve chamber with opposed, rectangular lateral ports of less height than said chamber; a valve gate rotatable in said chamber, said gate being equal in height to said chamber and being formed as a minor segment of a solid cylinder having a parti-cylindrical outer face and a flat, chordal, inner face; a valve plug of less height than said chamber, said plug being formed as the remaining major segment of said solid cylinder having a parti-cylindrical outer face and a flat chordal inner face slideably engaged on the said inner chordal face of said gate and means operable from outside said valve body for rotating said gate and axially sliding said plug within said valve chamber.

References Cited in the file of this patent

UNITED STATES PATENTS

| | | |
|---|---|---|
| 1,841,224 | Thomson | Jan. 12, 1932 |
| 2,237,784 | Iler | Apr. 8, 1941 |
| 2,322,374 | Lowe | June 22, 1943 |
| 2,630,293 | Smith | Mar. 3, 1953 |
| 2,774,363 | Benzien | Dec. 18, 1956 |

FOREIGN PATENTS

| | | |
|---|---|---|
| 424,024 | Great Britain | Feb. 13, 1935 |